(12) United States Patent
Mueller et al.

(10) Patent No.: US 6,419,996 B2
(45) Date of Patent: *Jul. 16, 2002

(54) LASER-SUPPORTED PROCESS FOR CLEANING A SURFACE

(75) Inventors: Gerhard Mueller; Thomas Fricke, both of Berlin (DE)

(73) Assignee: Laser-und Medizin-Technologie gGmbH, Berlin (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/189,939

(22) Filed: Nov. 12, 1998

(30) Foreign Application Priority Data

Nov. 12, 1997 (DE) .......................... 197 49 981

(51) Int. Cl.$^7$ ................................. B05D 3/00
(52) U.S. Cl. .................. 427/554; 427/421; 427/596
(58) Field of Search ................ 427/554, 596, 427/421

(56) References Cited

U.S. PATENT DOCUMENTS 4,987,286 A * 1/1991 Allen
5,267,856 A 12/1993 Wolbarsht et al.

FOREIGN PATENT DOCUMENTS

| DE | 39 11 871 | 10/1990 |
| DE | 41 38 468 | 6/1993 |
| DE | 196 15 633 | 4/1997 |

OTHER PUBLICATIONS

Patent Abstracts of Japan, vol. 008, No. 148 (M–308), Jul. 11, 1994 & JP 59 045092 A (Fuji Denpa Kouki KK), Mar. 13, 1994.

* cited by examiner

Primary Examiner—Bernard Pianalto
(74) Attorney, Agent, or Firm—Venable; Robert Kinberg

(57) ABSTRACT

A process to remove a surface layer from a substrate by irradiating laser radiation, wherein the surface is scanned sequentially with the laser radiation being concentrated to a focus, before irradiating a predetermined surface element a thin fluid film or a fluid droplet cover is applied which covers at least that surface element, and the laser beam influences the surface element only for a very short treatment interval, especially less then 10 ms. By appropriate choice of the process parameters power density, treatment interval length, thickness of the fluid film, surface adhesion of the fluid, absorption characteristics of the fluid for the effective laser wavelength, and absorption characteristics of the fluid vapor an explosive evaporation of the fluid film is effected which results in a flaking of the surface and an evaporation of loose residues of the surface layer.

11 Claims, 5 Drawing Sheets

LASER-SUPPORTED PROCESS FOR CLEANING A SURFACE

FIELD OF THE INVENTION

This invention relates to a process to remove surface coatings from a substrate and an apparatus to carry out the process.

BACKGROUND OF THE INVENTION

As far as in the prior art $CO_2$-lasers are used to remove surface coatings from contaminated substrates, continuous-wave lasers are used to achieve the removal of organic and metal-organic contaminants by burning or evaporation. Herein, very high surface temperatures arise which are tolerated at most by metallic surfaces without additional damage of the surface to be cleaned. Continuous-wave laser treatment of nonmetallic substrates, especially plastic or biological materials, results in a decarbonization which destroys the substrate. In the case of ceramics and similar substrates a fragmentation from the surface occurs because their poor heat conduction results in high local thermal stress.

Therefore the purification of surfaces with a continuous wave laser has been restricted to only a few special fields.

BRIEF DESCRIPTION OF THE INVENTION

The object of the invention is to provide a process and an apparatus to remove—in the frames of a surface cleaning—color or oxide coatings or equivalents even from non-metallic surfaces with continuous-wave lasers.

This object is solved with a process to remove a surface layer from a substrate by irradiating laser radiation, wherein the surface is scanned sequentially with the laser radiation being concentrated to a focus, before irradiating a predetermined surface element, a thin fluid film or a fluid droplet cover is applied which covers at least the surface element, and the laser beam influences the surface element only for a very short treatment interval, especially less than 10 ms, wherein by appropriate choice of the process parameters including power density, treatment interval length, thickness of the fluid film, surface adhesion of the fluid, absorption characteristics of the fluid for the effective laser wavelength, and absorption characteristics of the fluid vapor an explosive evaporation of the fluid film is effected which results in a flaking of the surface and an evaporation of loose residues of the surface layer.

Surprisingly the disadvantages of a continuous-wave $CO_2$ laser for substrate purification can be avoided by a combination of three characteristics:

First, the laser radiation is no longer guided over a broad area of the coated surface but it is focussed at a very high degree (nearly diffraction-limited) to achieve very high power densities (higher than 50 kW/cm$^2$, preferably 250 kW/cm$^2$).

Furthermore, the surface to be cleaned is covered with a thin liquid or droplet film, respectively, preferably immediately prior to the application of the laser radiation. The liquid film is applied e.g. with a spray nozzle ejecting an aerosol consisting of a gas/liquid mixture and being directed to the surface to be worked. The pre-moistening of the surface to be worked prior to the laser cleaning has the following effects: Using an appropriate liquid, preferably water, the $CO_2$-laser radiation is absorbed nearly completely by the liquid. Under very high power densities and a focus diameter normally not higher than 2/10 mm, the liquid locally evaporates in an explosion. As a consequence of the surface adhesion of the liquid to the coating and the shock waves from the explosive evaporation, the coating of the surface to be cleaned flakes off and is carried away with the vapor flowing away.

According to a further feature of the invention the highly focussed laser beam is advanced over the working surface with a high speed. Typical scanning speeds are clearly higher than 1 mm/s. The result is that a surface element to be cleaned is exposed to the intense laser radiation for only a very short time, especially less then 10 ms. This leads, on one hand, to the above mentioned explosive evaporation and has, on the other, the result that the change of the transmission state of the liquid film during the evaporation (water vapor is a scale more transparent for $CO_2$ laser radiation than a water film) provides just an intermediate radiation exposure with drastically reduced power density. Therefore, on the one hand the actually treated surface element will not be overheated, and on the other the process parameters can be chosen in dependence on the characteristics of each surface to be cleaned such that the remaining contamination can just be thermally evaporated.

Besides the above described effects, the combination of the process elements has an additional important advantage: As a result of an appropriate choice of the fluid, the molecules of the fluid react with the radicals developped from the contaminants during the explosive evaporation thereof. In this way, toxic and aggressive burning products and radicals can be bound. The vapor cloud from the evaporated fluid (water), the evaporated surface contaminant and the radicals bound in the fluid preferably will be sucked out and absorbed in a well-known filter system.

By combining those features the release of reaction products being dangerous for the environment during the surface cleaning is prevented. Neither are volatile and toxic gases produced nor do chemical active residues remain on the surface—contrary to prior art cleaning techniques.

For the surface moistening, preferably by means of application of an aerosol, very thin films of a preferred thickness of 0.05 to 0.5 mm are formed so that only an extremely small amount of fluid is needed. In a preferred embodiment 1 liter liquid is sufficient for 10 m$^2$ surface to be cleaned. In a further preferred embodiment of the invention the used liquid is recycled by means of a liquid separator in the filter system.

Besides water, other fluids can be used as long as they serve—exploiting the inventive idea—as a catcher for radicals of exhaust gas products of the contaminant removal evaporating during the removal of the surface coating, and are suitable to moisten a surface—especially even hydrophobic surfaces.

By means of the proposed process surface coatings can be removed from inorganic surfaces, especially ceramics, and organic, especially polymeric and biological, surfaces.

Below the implementation of the inventive process in an apparatus is described in more detail in connection with a preferred embodiment.

The radiation of the $CO_2$ laser is guided to a working handpiece by means of a prior art multi-mirror articulated arm or prior art optical waveguides. The handpiece contains the collimating and focussing optics for the $CO_2$ laser radiation on the one hand and a scanning mechanism on the other which mechanism allows to guide the focussed laser beam over the entire surface to be treated. The scanning mechanism is arranged such that no turn-back points exist where the scanning speed becomes zero, i.e. its arrangement is circular, ellipsoidal or in the form of Lissajous figures. The laser radiation is guided to the surface under an angle differing from 90° to prevent flowing-back of the material being explosively evaporated from the surface against the focussing optics and to avoid damage of the optics. The spraying nozzle for the aerosol is arranged essentially paraxial, but under a small angle against the direction of the axis of incidence of the laser beam such that primarily only a limited area is moistened which area essentially matches with the surface element to be actually influenced by the scanning laser beam.

Both main parts, the laser optic including the scanning means and the aerosol nozzle, are placed in an exhaust cage so that they can be guided by moving means (typically two or three steerable rolls or preferably three moving ball-bearings) to work at a small distance to the working surface. By virtue of the exhaust power in the exhaust nozzle a strong lateral flow arises in the narrow gap between exhaust cage and surface. This contributes to the prevention of contamination of the working optics by the evaporated removed products. Furthermore, the exhaust cage is arranged such that it allows free sight at the working surface through suitable windows or by virtue of its production from a transparent material. The window material is selected to absorb the used laser radiation such that—if the handpiece is used in accordance with the rules—the whole laser apparatus is safe in itself and meets the industrial safety standards.

The whole arrangement is mounted on an ergonomically designed handle resulting in an ergonomically simple use, Additionally the operation elements to trigger the laser radiation, to adjust the exhaust capacity and to adjust the aerosol mix are arranged at this handle.

Incidentally, preferred developments of the invention are specified in the dependent claims or described below in the context of a description of a preferred embodiment of the invention as illustrated in the figures.

DETAILED DESCRIPTION OF THE INVENTION

Figure 1:
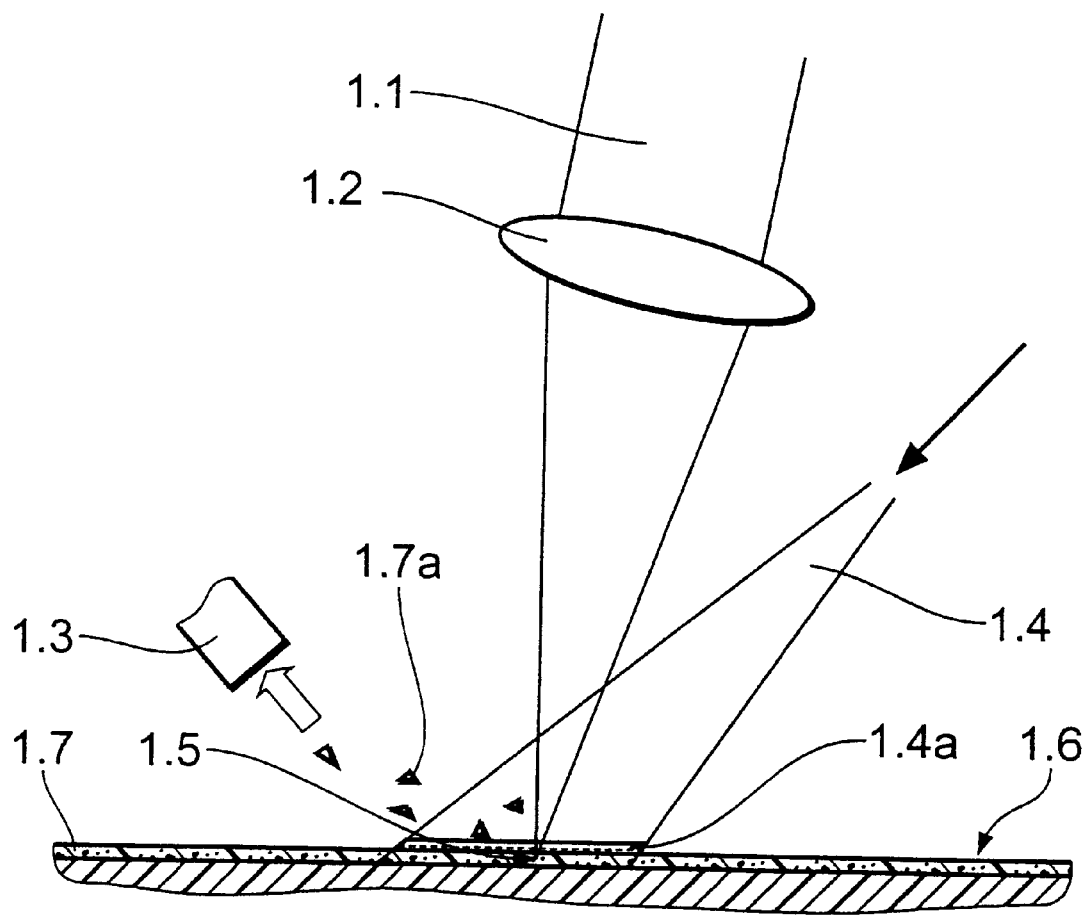
FIG. 1 illustrates the principles for carrying out the invention.

FIG. 1 illustrates the principles of the process in its preferred embodiment. A laser beam 1.1 is focussed at the working surface 1.6 with a contaminant layer 1.7 thereon by a focussing means 1.2., in the simplest case a focussing lens, such that the focus is exactly in the surface. The laser beam 1.1 is quickly advanced over the working surface 1.6. Simultaneously the area around the focus is moistened and conditioned by an aerosol spray 1.4 from a fluid 1.4' wherein on the contaminating layer 1.7 a very thin fluid layer 1.4a is formed. The vapor developed from the fluid film under the influence of the focussed laser radiation as well as the remaining liquid droplets and particles 1.7a of the layer 1.7 removed from the surface 1.6 are exhausted by an exhaust means 1.3.

Figure 2:
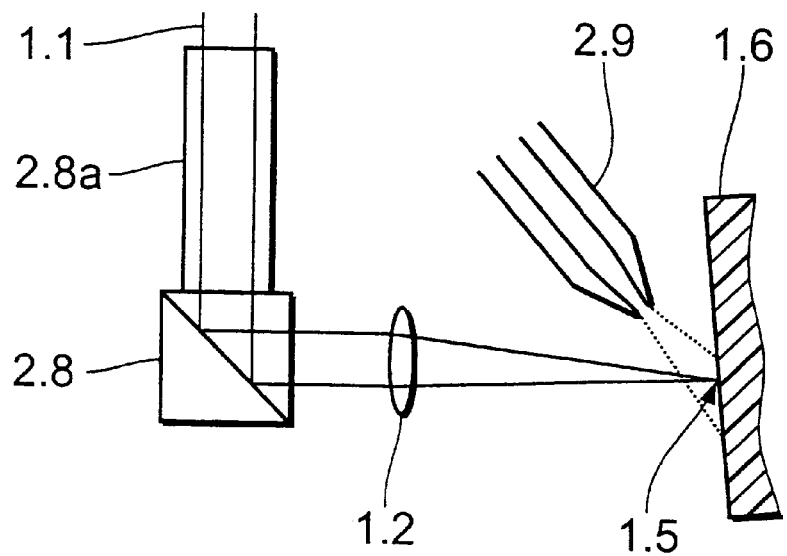
FIG. 2 schematically shows essential compounds of a preferred apparatus for carrying out the invention.

As shown in FIG. 2, by means of the use of the scanner 2.8 it is possible to achieve a constant deflection speed of the focus 1.5 of the laser beam 1.1 on the working surface 1.6. The laser beam 1.1 is coupled into the scanner 2.8 through an optical fiber (not shown), an optical waveguide or an articulated mirror arm and by means of an appropriate adapter 2.8a. The focussing means 1.2 is (as seen from the laser) arranged behind the scanner 2.8. The aerosol spray 1.4. from the spraying nozzle 2.9 is directed to the surface under an acute angle, and so the area around the focus 1.5 is conditioned for the removal of the surface coating by the laser beam.

Figure 3:
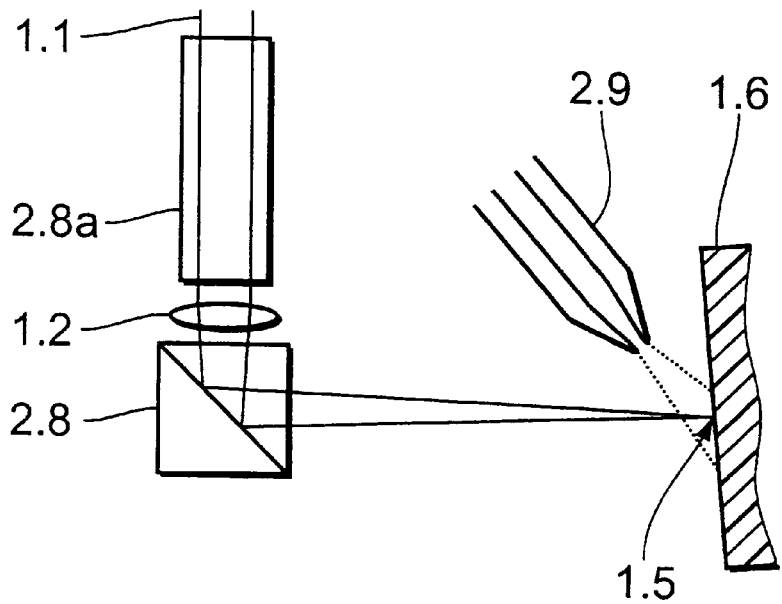
FIG. 3 shows an apparatus which is slightly modified as compared to the apparatus shown in FIG. 2.

The apparatus in FIG. 3 essentially corresponds to that of FIG. 2, with the differences that the focussing means 1.2. is in front of the scanner 2.8 and the adapter 2.8.a is not integrated into the scanner.

Figure 4:
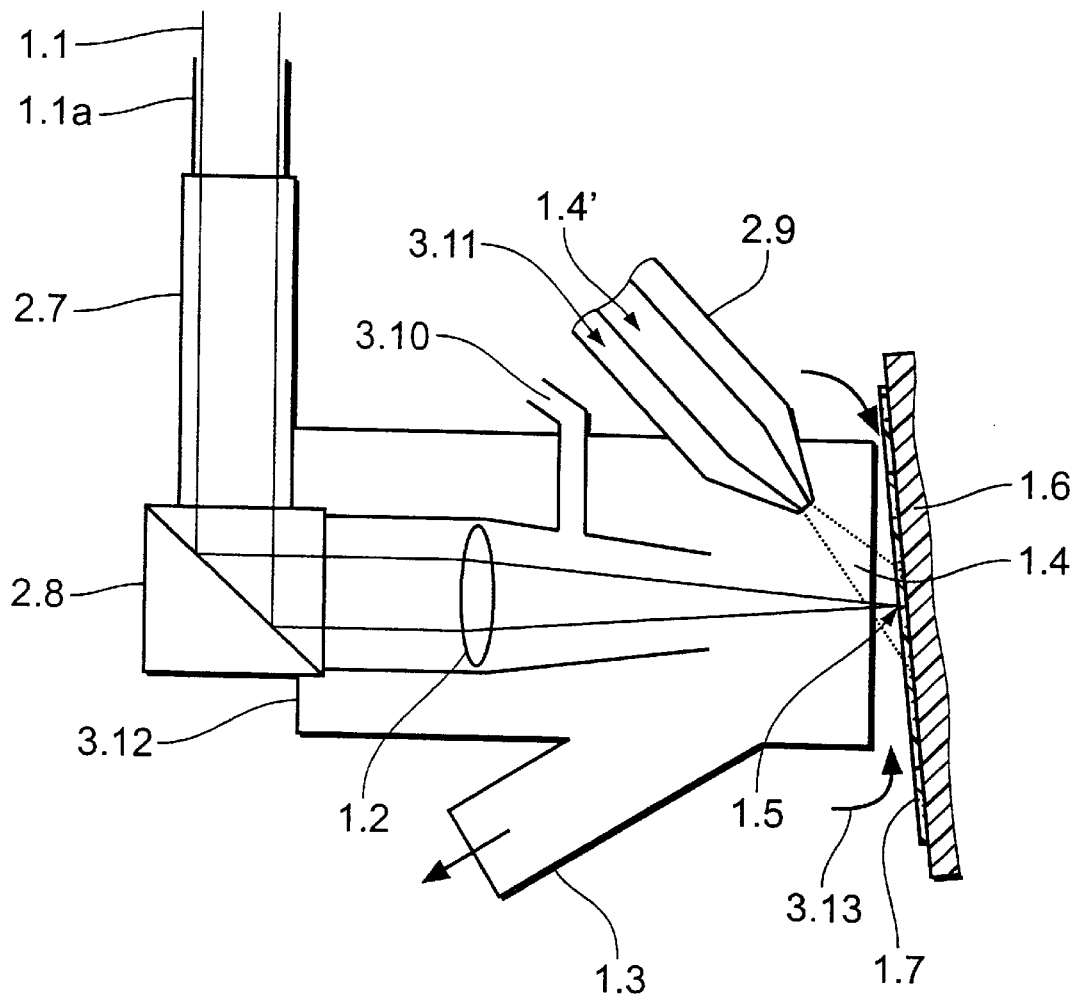
FIG. 4 shows the entire arrangement of the first embodiment.

FIG. 4 shows an arrangement of the essential parts and elements of a working head for carrying out a laser supported surface cleaning. An optical waveguide system 1.1a for the laser beam 1.1 is connected to the scanner 2.8 and the focussing means 1.2 by means of an adapter 2.8a. A gas flush 3.10 is arranged in front of the focussing means 1.2 and the scanner 2.8 so that no damage of the optical surfaces can occur by the aerosol 1.4 or particles burst off from the coating 1.7 on the working surface 1.6. In the spraying nozzle 2.9 a fluid 1.4' is mixed with a process gas 3.11 and sprayed onto the surface around the focus 1.5 as an aerosol 1.4. The spraying nozzle 2.9, the focussing means 1.2 with the gas flush 3.10, and the surface portion around the focus 1.5 are surrounded by an exhaust cage that is connected to a exhaust equipment 1.3. Through a gap between the exhaust cage 3.12 and the surface 1.6 a transversal air flow develops, in the figure symbolically indicated by arrows.

Figure 5:
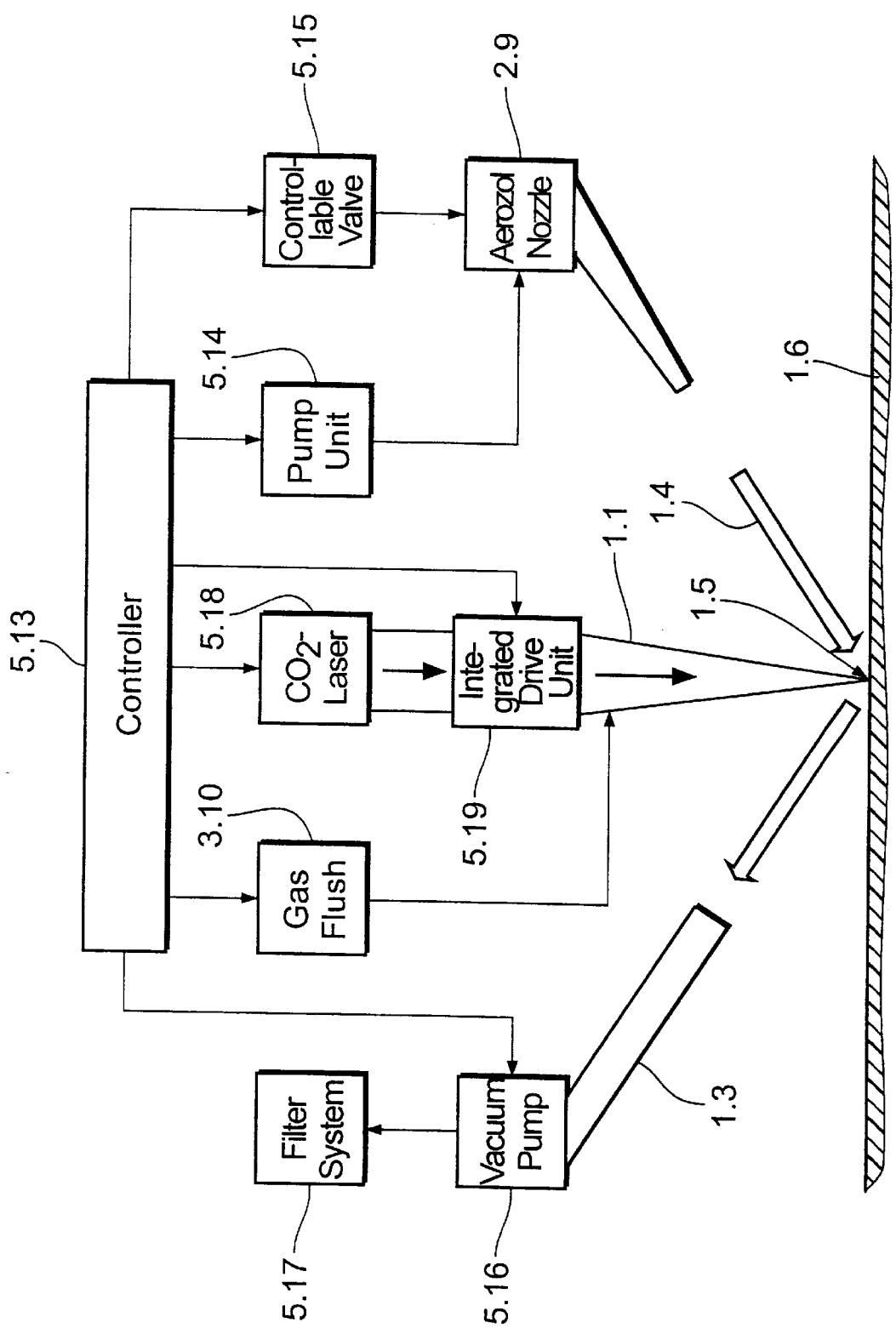
FIG. 5 schematically shows the control means for an embodiment of the invention.

For achieving optimum results, all parameters of the process are adjusted, controlled and monitored in accordance with the specific application. This is managed by process control means comprising a controller 5.13 which—as an example—schematically is shown in FIG. 5. According to FIG. 5 all controllable functional units as shown in the previous figures which influence the surface cleaning effect are connected to the controller 5.13 which controls and monitors all of them.

This is valid for the pump unit 5.14 which delivers the moistening liquid, a controllable valve 5.15 for the process gas, and—in the most general case—the aerosol nozzle 2.9 itself, too. A vacuum pump 5.16 that is part of the exhaust equipment 1.3 is connected to a filter or filter system 5.17 that absorbs eventual ecologically damaging products from the surface coating or the aerosol or their reaction products, and this pump is controlled and monitored by the controller 5.13 as well.

Finally, the controller 5.13 controls the $CO_2$-laser beam 5.18 and the integrated drive unit 5.19 of the focussing means 1.2 and the scanner 2.8 (FIG. 4).

Figure 6:
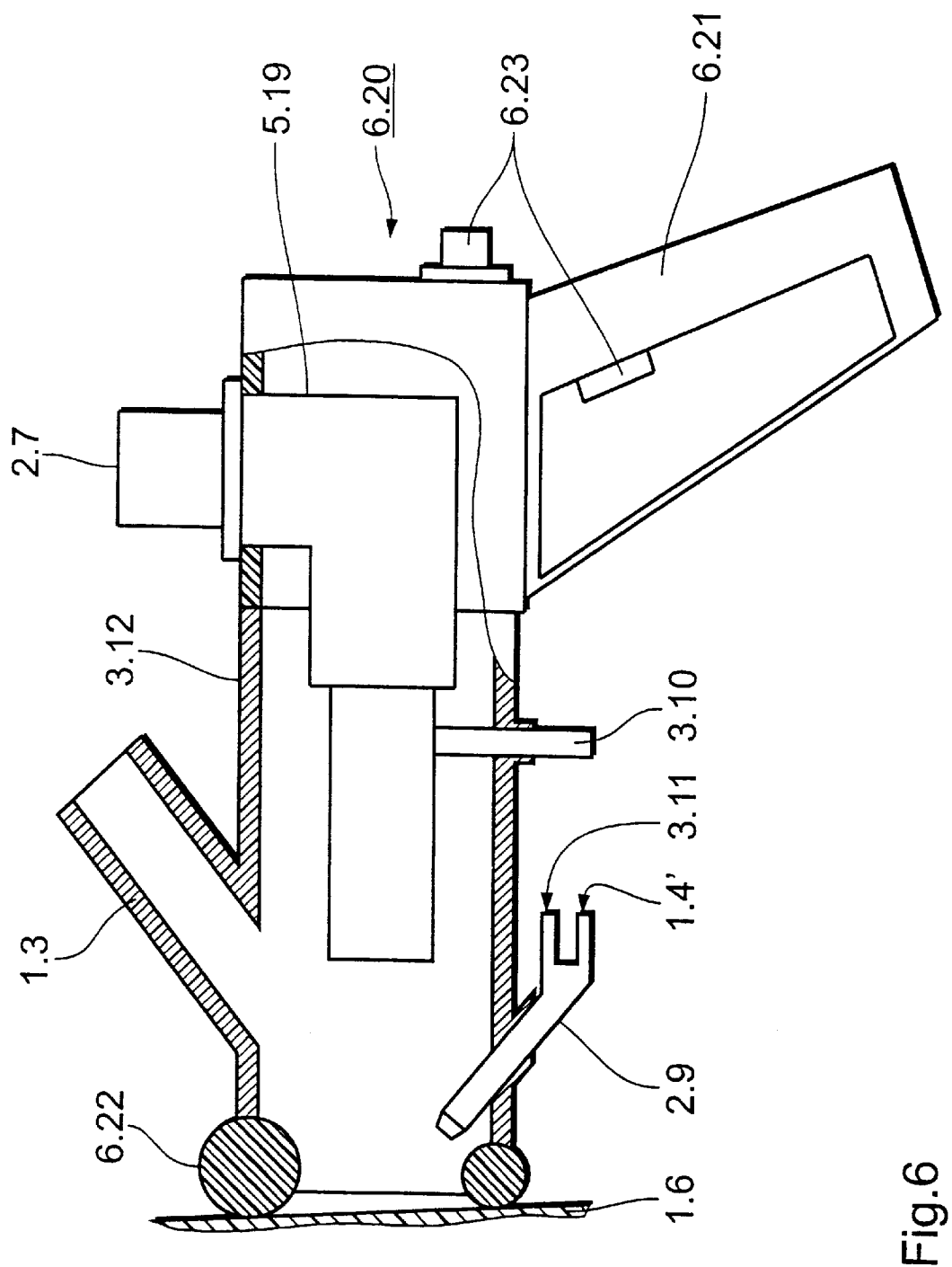
FIG. 6 shows the entire arrangement of a further embodiment.

FIG. 6 shows, as a prototype, a preferred embodiment for cleaning a surface with continuous-wave laser radiation. The focussing means 1.2, the scanner 2.8 and the drive unit 5.19 (here altogether sketched as a single unit 5.19) as well as the adapter 2.7 for a articulated mirror arm (not shown) or optical waveguide are mounted in a case 6.20 that in the front parts works as an exhaust cage 3.12 and is connected to an ergonomic handle 6.21. Operating elements 6.20 are installed at the case and at the handle such that they are easy to use with one hand.

Further to components shown in FIG. 4 and explained above, the apparatus includes a spacer and moving means 6.22 that—in the simplest embodiment—consists of two or three wheels in different sizes. This spacer and moving means assures that the distance between the focussing means with scanner and the working surface 1.6 is constant. By virtue of the narrow gap between surface 1.6 and exhaust cage 3.12 a high flow speed of the sucked-in air is achieved. This results in a minimum probability of an emission of ecologically damaging substances from the exhaust cage. Furthermore, the escape of scattered invisible laser radiation is prevented since the exhaust cage is made of a material which absorbs invisible laser radiation but is transparent for visible light.

In a further development of the inventive concept any other laser wavelength of a continuous or quasi-continuous laser can be used as long as the above mentioned process can be carried out therewith. For example wavelengths of the $CO_2$ laser in the range between 9.2 and 9.8 $\mu$m can be utilized, as well as for certain substrates or surface coatings well-known cw lasers working in the range between 1.5 and 3 $\mu$m or at wavelengths in the UV region below 380 nm are usable. It is advisable then to use a moistening liquid with absorption characteristics that are adapted to the laser wavelength. The use of wavelengths in the visible spectrum is only recommended for special cases since the used fluids that have to absorb the laser radiation are chromophores and are—even when applied in very small amounts—coloring and polluting the surface by themselves.

In a further development of the inventive idea pulse lasers or triggered lasers may be used. A sufficient single pulse energy would eliminate the necessity to implement a focussing apparatus or a costly scanning apparatus, respectively. The effect would be a further technical simplification of the process. Especially TE or TEA-$CO_2$ lasers are useful, as well as pulsed solid laser systems on the basis of Nd:YAG, Ho:YAG, Er:YAG or lasers which use the same rare earth doping but different grids, as e.g. YSSG, YLF or similar, as well as Nd:glass lasers and similar prior art laser sources—each of them combined with an adequate moistening liquid.

Alternative to the spraying-on of an aerosol, the liquid can be applied with a roll or another well-known coating system, depending on viscosity, desired layer thickness, advance speed of the laser focus etc.

What is claimed is:

1. A process to remove a surface coating from a substrate by irradiating laser radiation, comprising:
    covering at least a predetermined surface area of the surface coating with a thin fluid film to a thickness of 0.05 to 0.5 mm, the surface coating being located between the fluid film and the substrate; and
    scanning the surface coating with laser radiation concentrated to a focus to cause an explosive evaporation of the fluid film covering the surface coating, wherein as a consequence of surface adhesion of the fluid film to the surface coating and a shock wave from the explosive evaporation, the surface coating flakes off of the substrate.

2. The process of claim 1, wherein the scanning comprises using an interval of less than 10 mm as a treatment interval.

3. The process of claim 1, wherein the scanning comprises using radiation of a continuous wave $CO_2$ laser as the laser radiation and using water or an aqueous liquid as the fluid for the fluid film.

4. The process of claim 1, wherein the covering step includes spraying a mixture of a fluid with a gas onto the surface coating.

5. The process of claim 4, wherein the spraying comprises spraying an aerosol.

6. The process of claim 1, wherein the covering step comprises applying the fluid film onto a specific surface area immediately prior to scanning with the laser radiation.

7. The process of claim 1, wherein the scanning comprises using a power density of the focussed laser irradiation of at least 50 kW/cm$^2$.

8. The process of claim 1, wherein the substrate comprises an inorganic material.

9. The process of claim 1, wherein the substrate comprises a ceramic material.

10. The process of claim 1, wherein the substrate comprises an organic material.

11. The process of claim 1, wherein the substrate comprises one of a polymeric and a biological material.

* * * * *